June 19, 1962  A. E. NEWTON ETAL  3,039,949
FUEL ELEMENT HANDLING APPARATUS
Filed Dec. 19, 1958  15 Sheets-Sheet 4
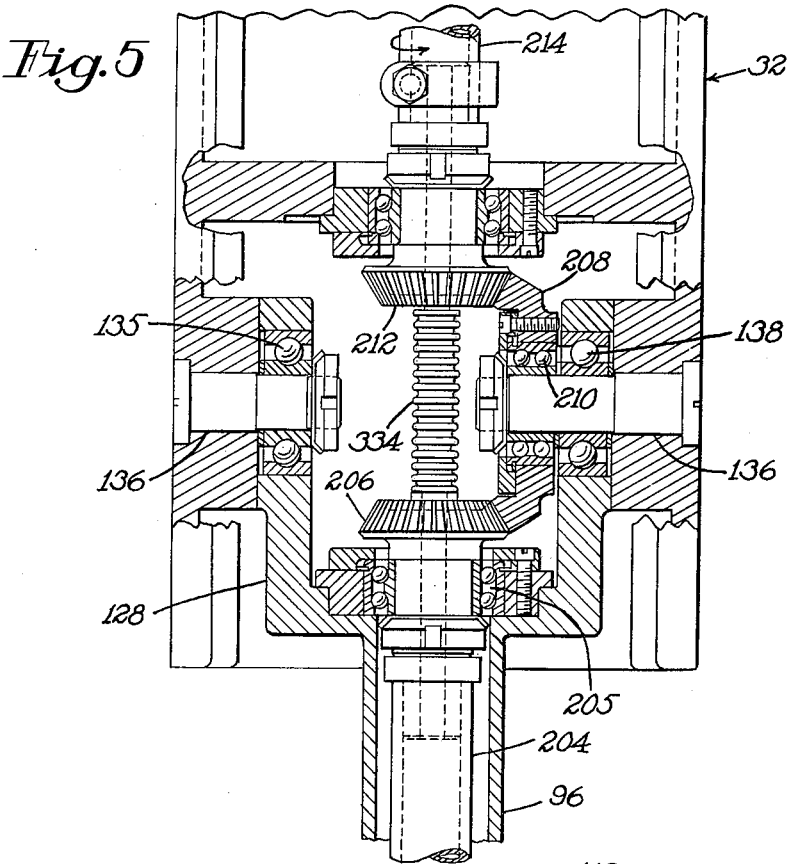
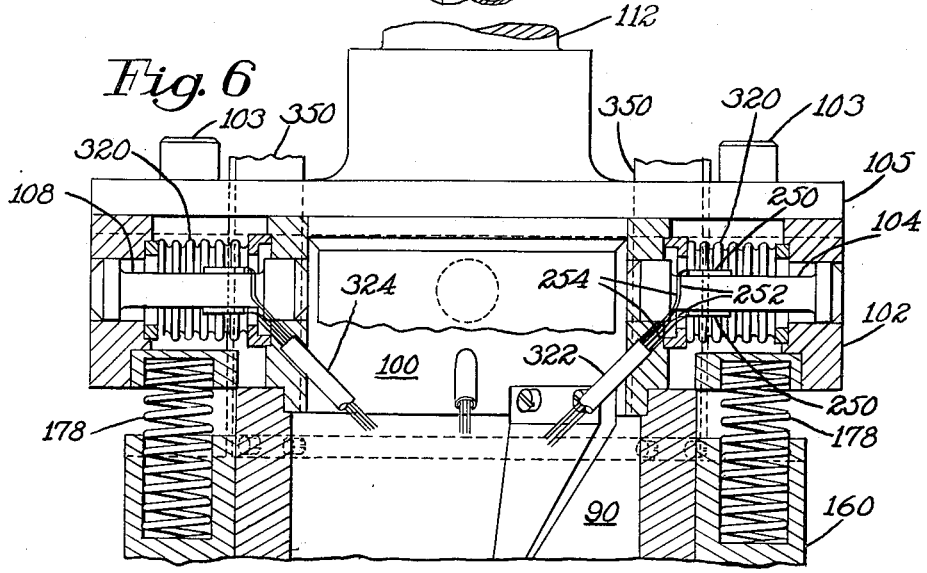

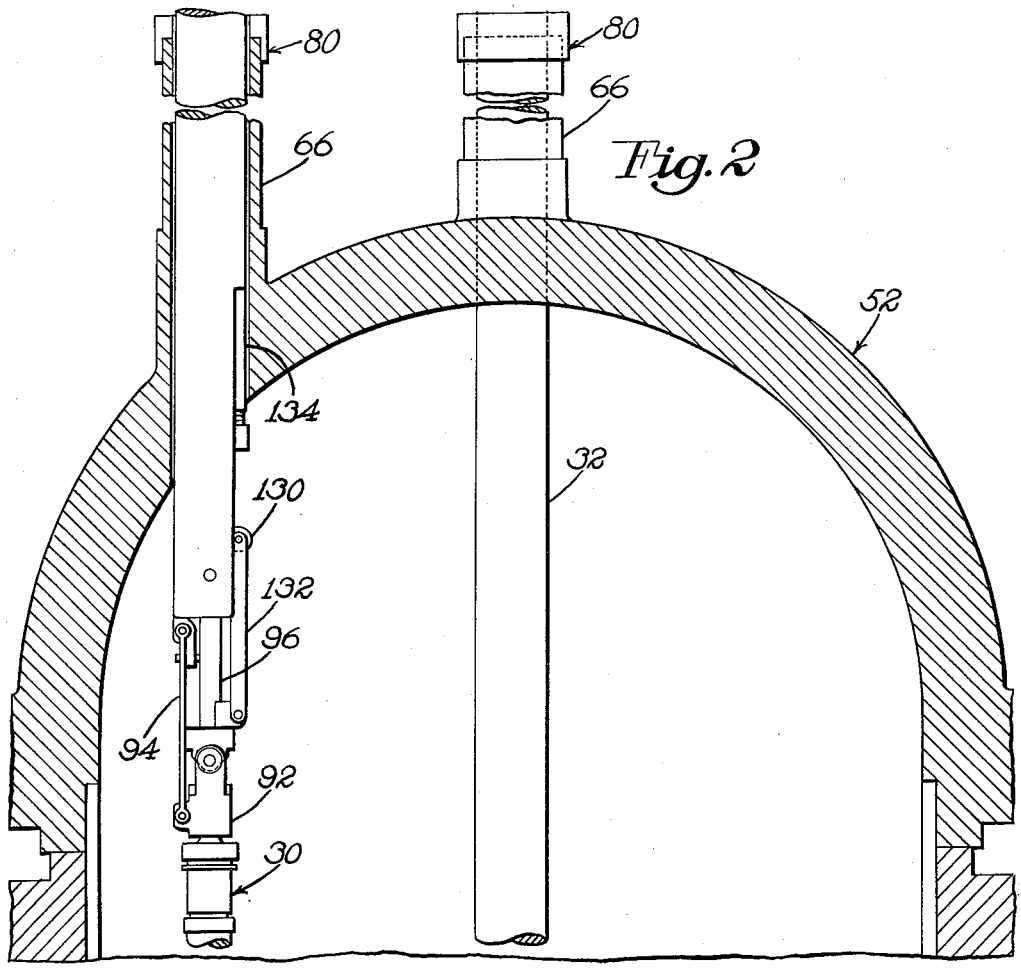
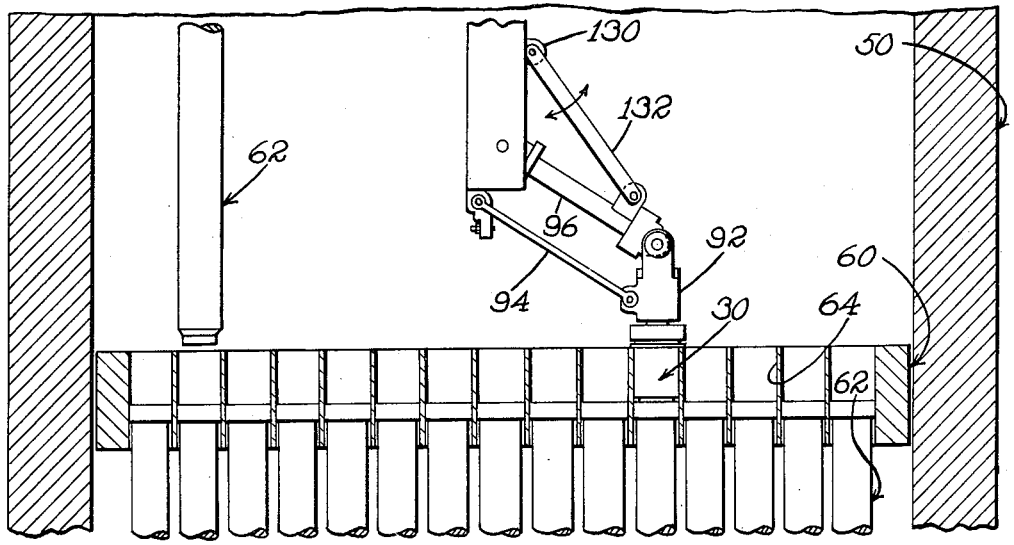
Fig. 2

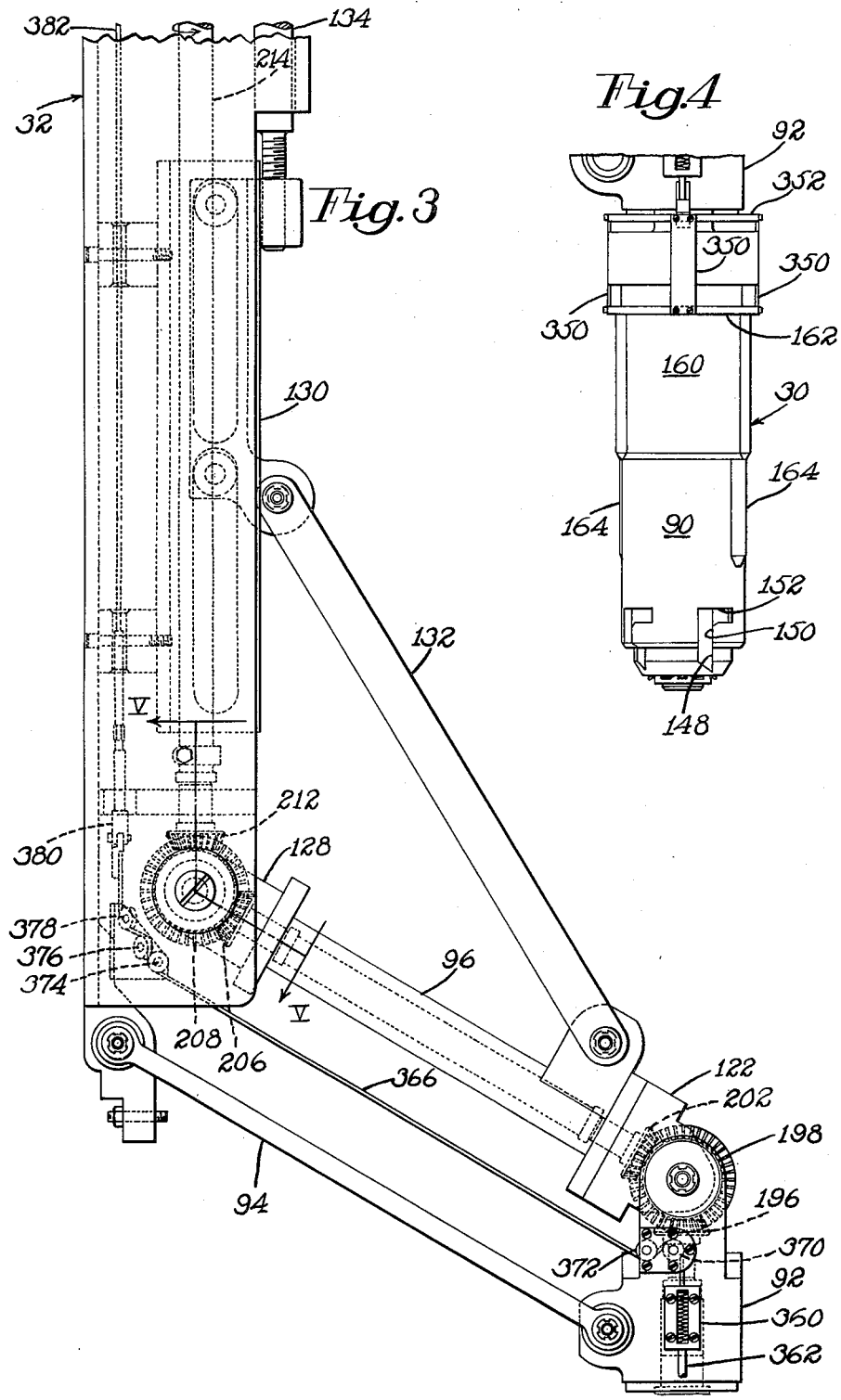

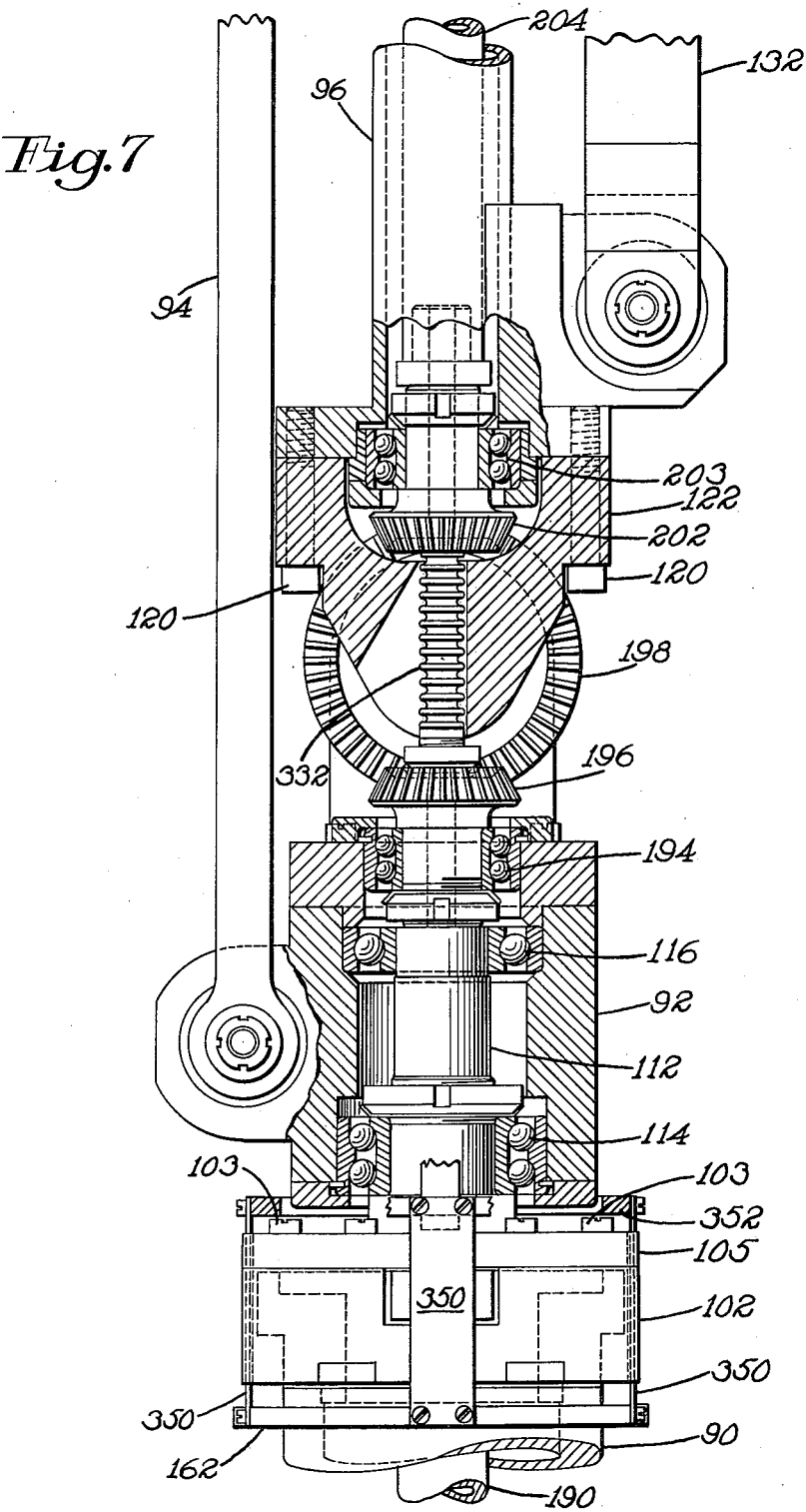

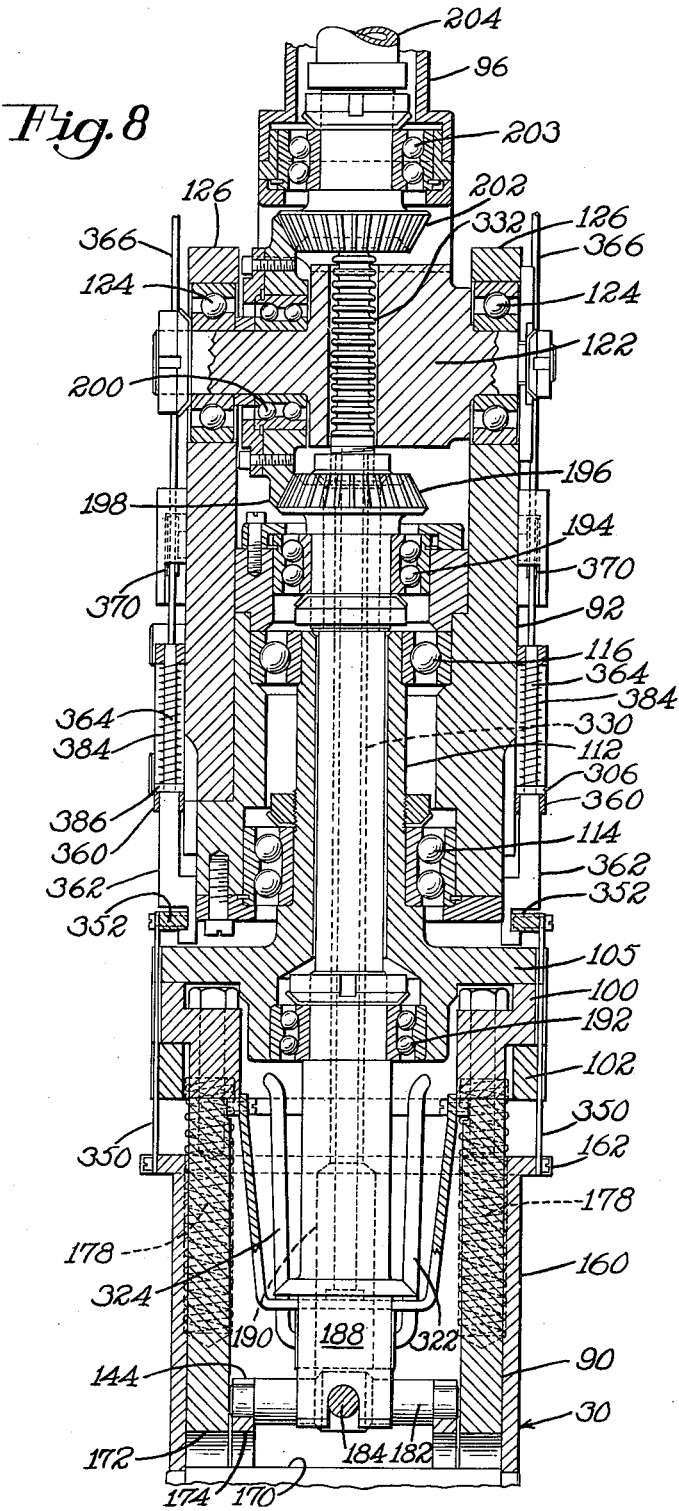

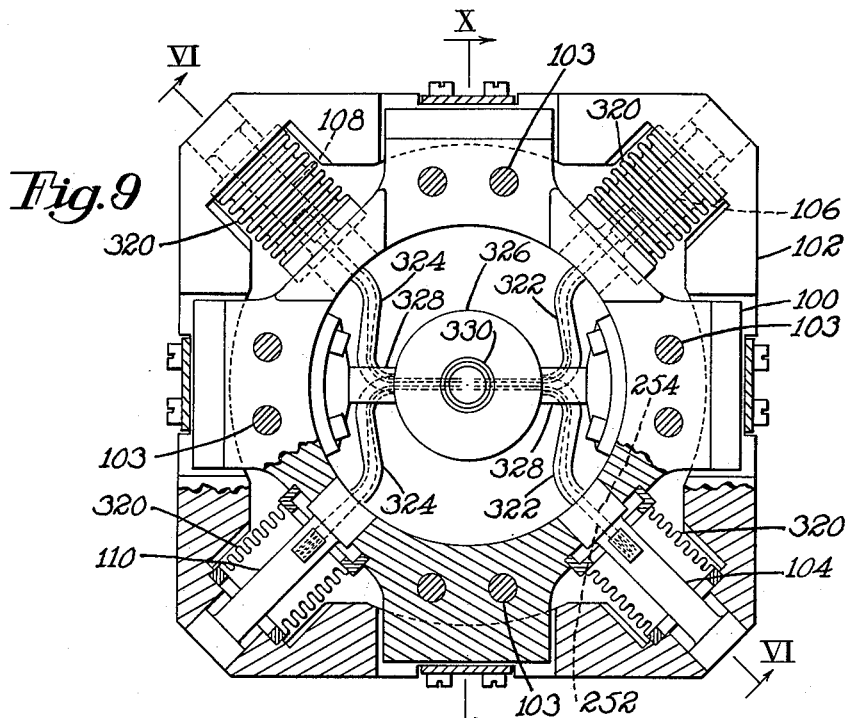
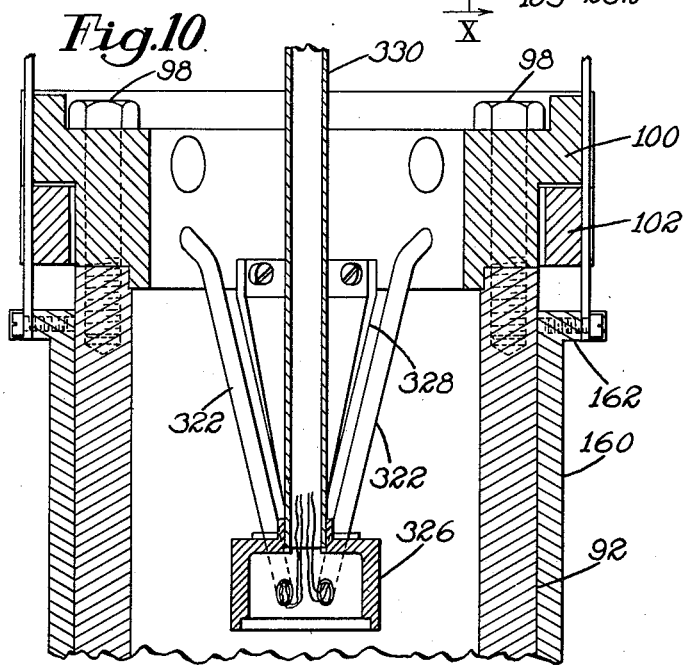

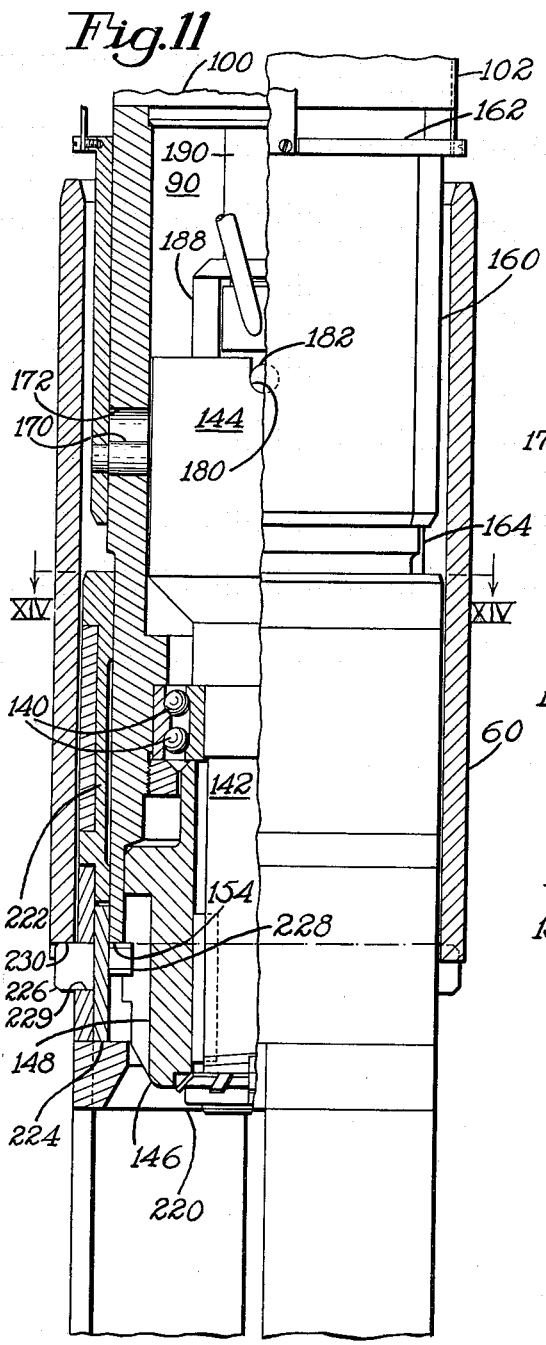
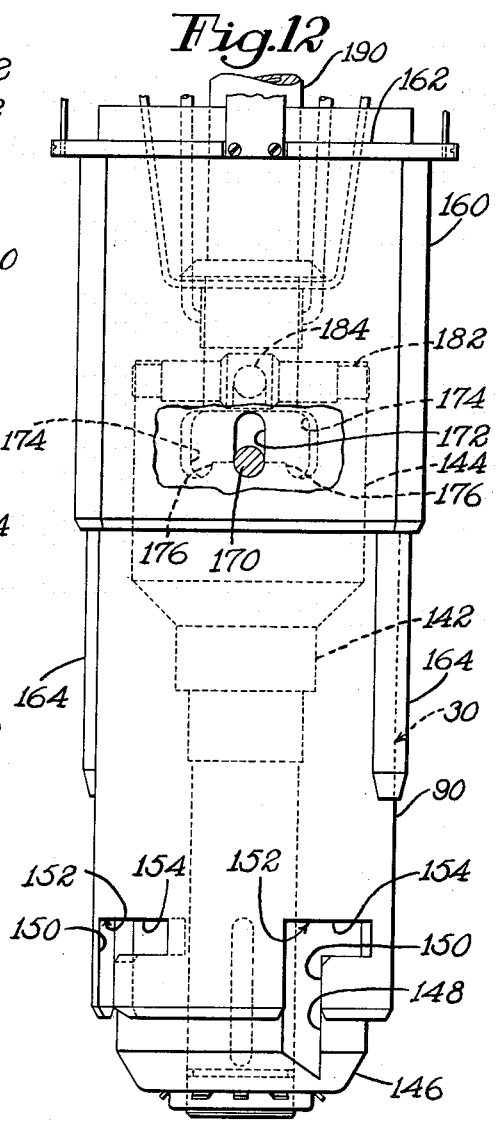

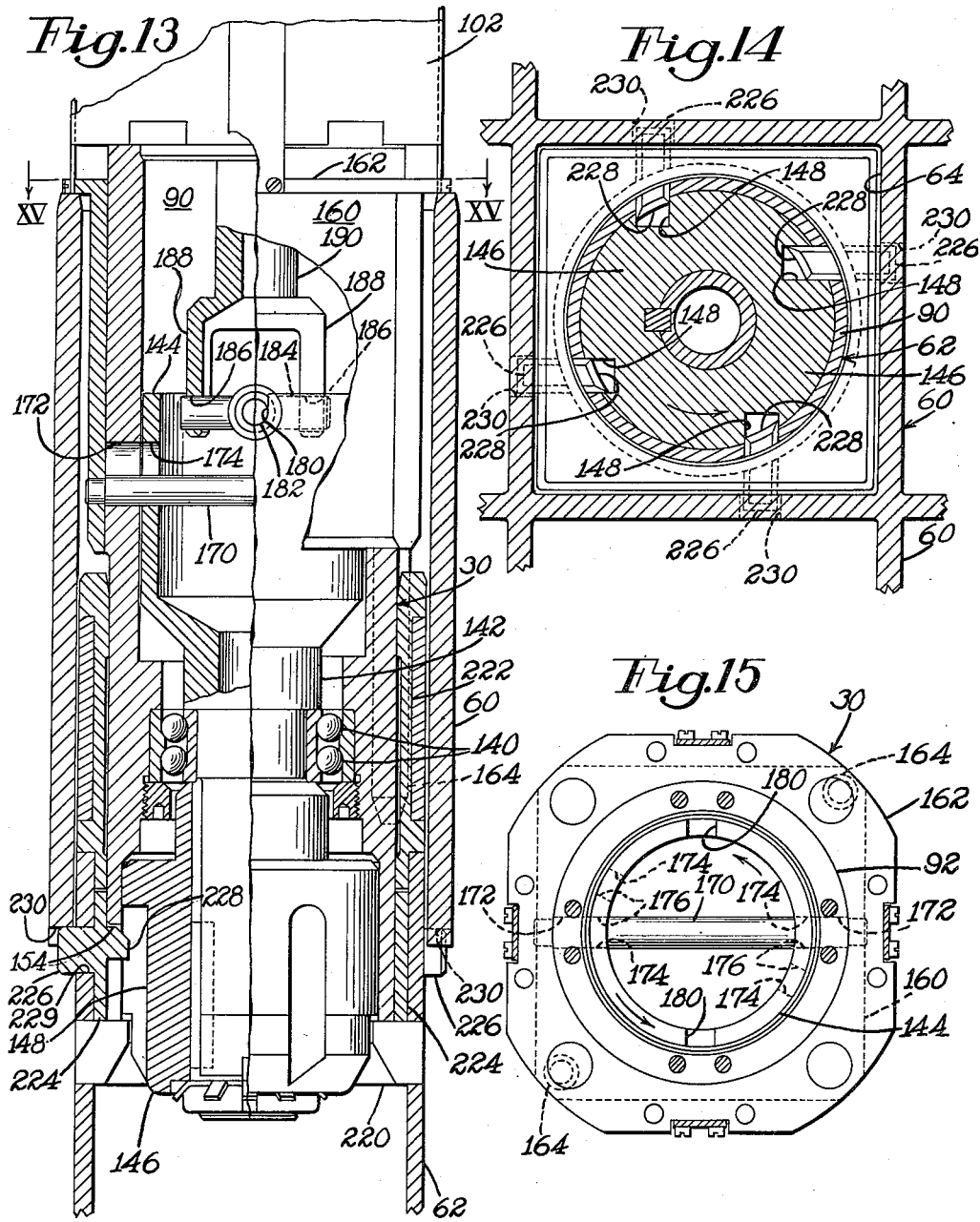

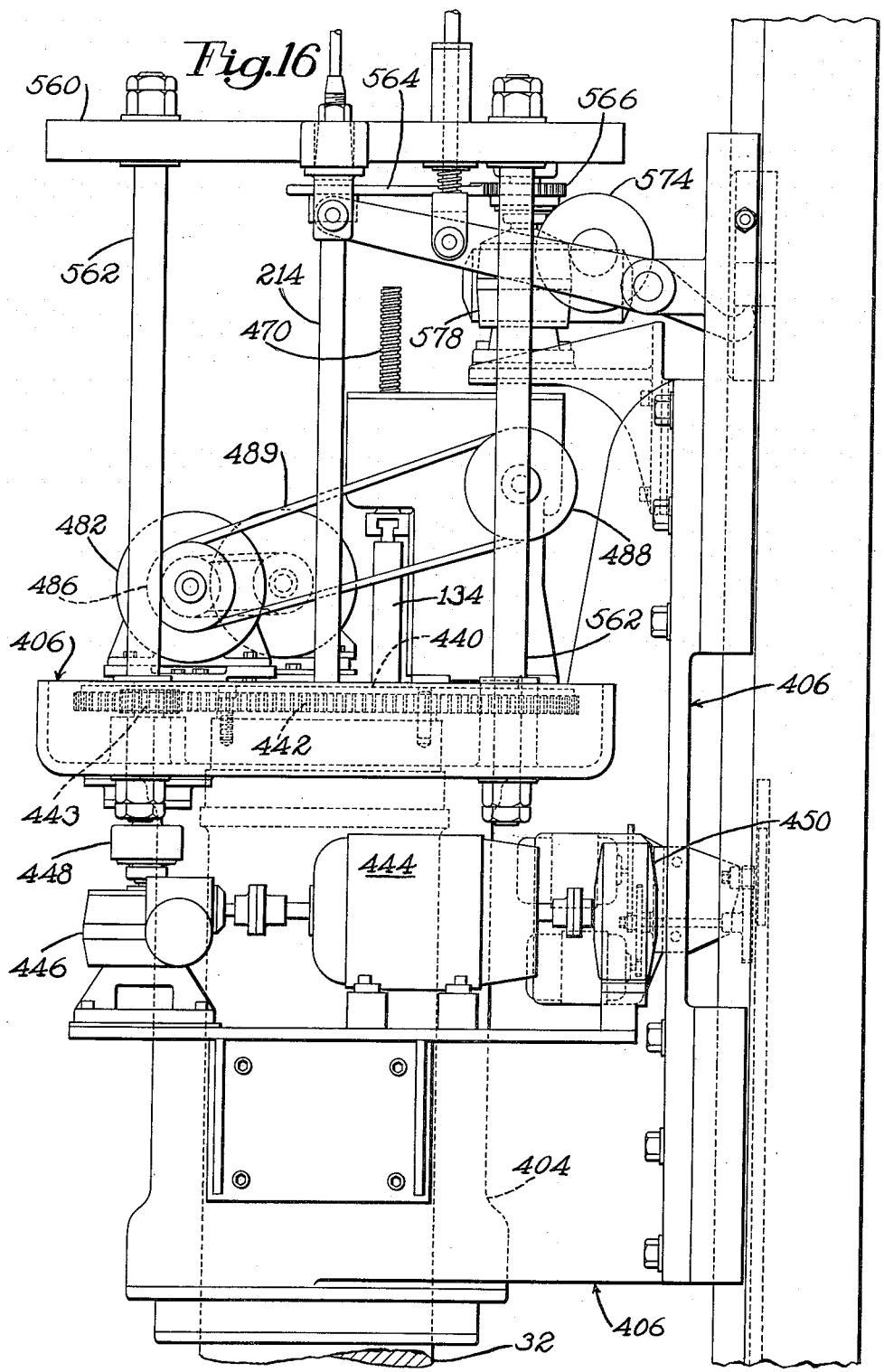

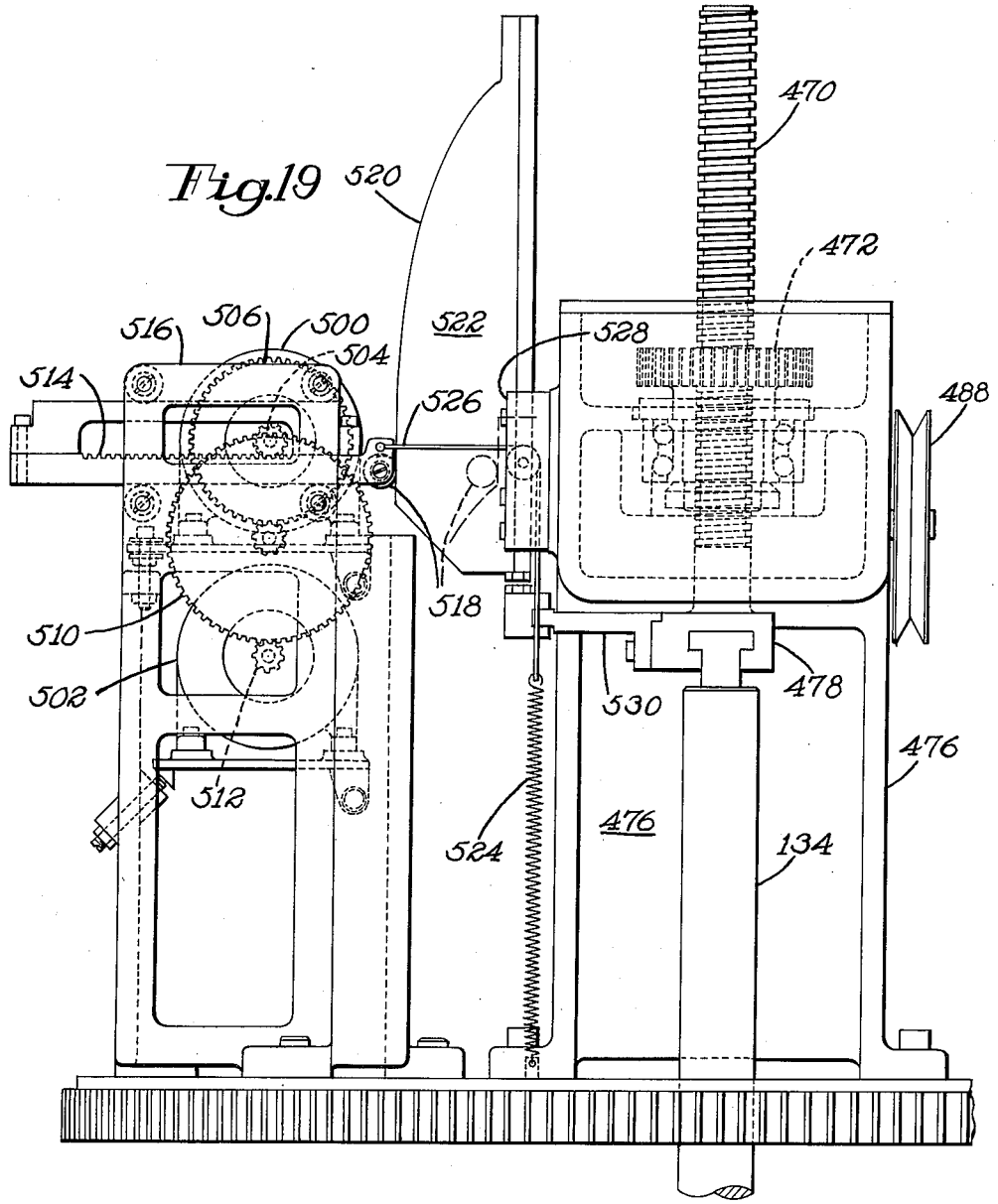

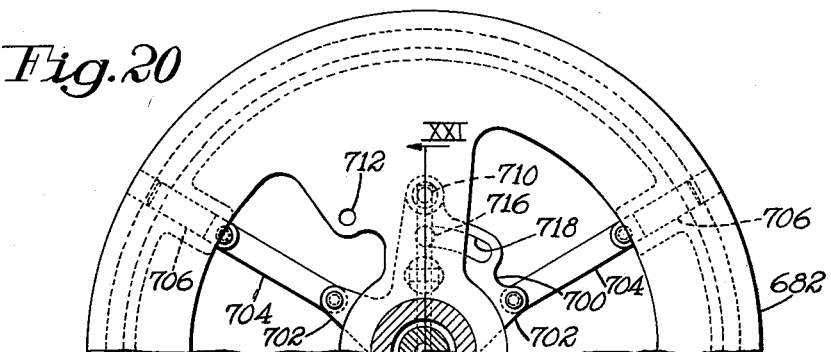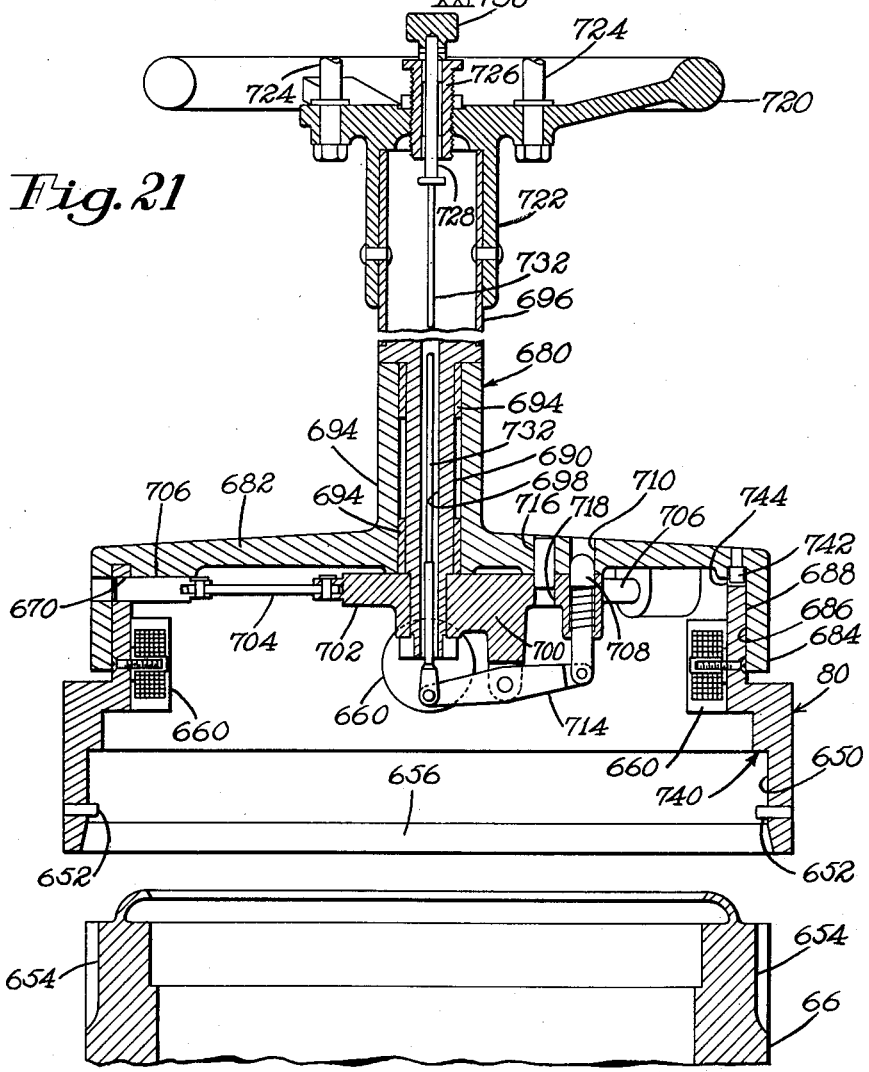

June 19, 1962  A. E. NEWTON ETAL  3,039,949
FUEL ELEMENT HANDLING APPARATUS
Filed Dec. 19, 1958  15 Sheets-Sheet 15
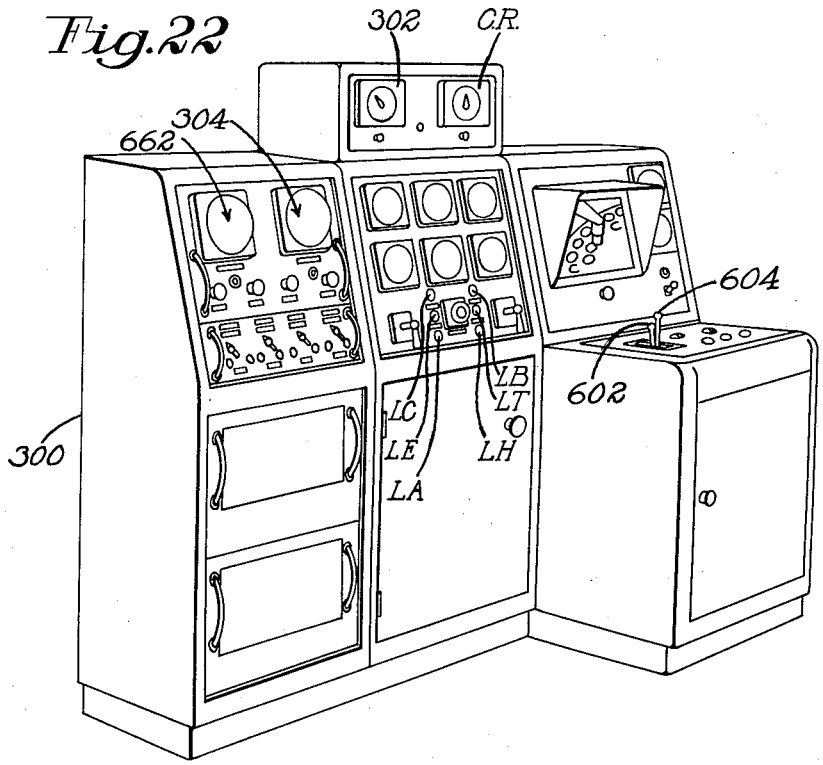
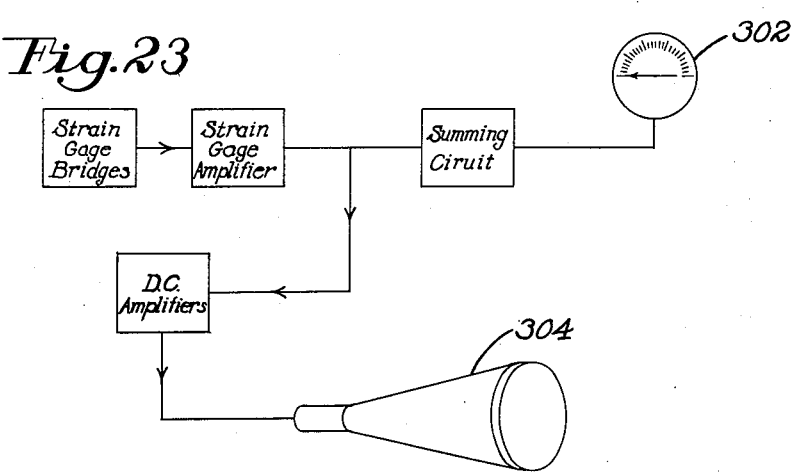

United States Patent Office 3,039,949
Patented June 19, 1962

3,039,949
FUEL ELEMENT HANDLING APPARATUS
Albert E. Newton, Beverly, and George K. Richardson, Wenham, Mass., assignors to United Shoe Machinery Corporation, Flemington, N.J., a corporation of New Jersey
Filed Dec. 19, 1958, Ser. No. 781,618
15 Claims. (Cl. 204—193.2)

This invention relates to apparatus for handling fuel elements, and more particularly to a novel tool for extracting a fuel element assembly from an atomic reactor.

In a certain known type of atomic reactor, the fuel element assemblies are of elongated shape and generally square cross section and are mounted within the reactor vessel itself by means of upper and lower grid constructions having square-shaped openings in which the fuel elements are received. Each fuel element has an open upper end and carries a locking and coupling ring provided with two sets of lugs, one set extending outwardly therefrom for locking the fuel element to the upper grid construction and the other extending inwardly for engagement by an extraction tool. The upper portion of the reactor vessel is closed by a head in which there are a plurality of access ports so arranged with respect to the grid construction that all of the fuel elements may be reached by an extraction tool associated with a fuel handling apparatus and mounted for radial movement on a rotatable tool post inserted into the reactor vessel through these ports. Suitable operating mechanism including a crane mounted on a trolley and a bridge construction are associated with the fuel handling apparatus for elevating and lowering the tool post and for moving it bodily in two directions at right angles and transverse to the axis of the post to aline it with a selected access port and also for rotating the post and for moving the extraction tool radially relatively thereto for alining the tool with a selected fuel element assembly.

A principal object of this invention is to provide a novel fuel element extraction tool which is especially well-adapted for use with fuel handling apparatus of the above type for the removal of fuel elements of the kind described above from an atomic reactor and/or for loading such fuel elements thereinto. With this object in view, and in accordance with a feature of the invention, the herein illustrated extraction tool is provided with a body portion having surfaces for receiving the lugs on the locking ring of a fuel element assembly, a coupling member for engaging these lugs, means for rotating the coupling member to two different angular positions, together with means for locking the coupling member to the body portion in each of said positions. More particularly, the body portion, which is of cylindrical shape to be received within the grid openings and within the open upper end of a fuel element, is provided with a plurality of circumferentially arranged surfaces for receiving and supporting the lugs of a fuel element locking and coupling ring, together with a plurality of axially extending passages providing access to said surfaces, while the coupling member has axially extending surfaces for engaging these lugs, and means including a sleeve is provided for locking the coupling member to the body portion of the tool in one of two positions, in one of which the lug engaging surfaces are in alinement with the axial passages in the body portion, and in the other of which said surfaces are disposed across the lug receiving surfaces of the body portion, this sleeve being urged yieldingly to locking position and having a radially extending flange adapted to engage the upper surface of the fuel element supporting grid for displacing the sleeve axially to unlock the coupling member as the tool is lowered into the fuel element.

For the purpose of facilitating the operation of the extraction tool, especially during its insertion into the open upper end of a fuel assembly and the subsequent withdrawal of the tool with the fuel element coupled thereto, there is, in accordance with another feature of the invention, interposed between the tool and its support, a load supporting means having associated therewith strain measuring devices for sensing the direction and magnitude of the load imposed on the tool. More particularly, this load supporting means comprises inner and outer ring-like members which are connected by four radially extending beams arranged in quadrature, each of said beams having mounted on its upper and lower surfaces, adjacent to its point of connection to the inner member, a strain gage. These strain gages are associated with conventional bridge circuits, the outputs of which, after suitable amplification, are connected to an oscilloscope, and through a summing circuit, to a voltmeter; the oscilloscope and meter providing remotely located means for visually indicating information sensed by the strain gages.

The above and other objects and features of the invention will appear in the following detailed description of a preferred embodiment thereof which is illustrated in the accompanying drawings and will be pointed out in the claims.

In the drawings,

FIG. 2 is a view of the upper portion of the reactor vessel, shown in vertical section and at an enlarged scale, with the extraction tool and lower portion of the tool post shown in two different operating positions;

FIG. 3 is a view in side elevation and at a still further enlarged scale of the lower portion of the tool post;

FIG. 4 is a view in side elevation of the extraction tool shown at the same scale as FIG. 3;

FIG. 5 is a view in vertical section, substantially on line V—V of FIG. 3 and looking in the direction of the arrows, and at an enlarged scale;

FIG. 6 is a view in side elevation of a portion of the tool and with certain parts in vertical section substantially on line VI—VI of FIG. 9 and looking in the direction of the arrows;

FIG. 7 is a view in side elevation and at an enlarged scale of the upper portion of the extraction tool and associated supporting housing with some parts shown in vertical section;

FIG. 8 is a view similar to that of FIG. 7 but taken at right angles thereto and with most of the parts shown in vertical section;

FIG. 9 is a plan view of a load ring construction associated with the extraction tool;

FIG. 10 is a view in section substantially on line X—X of FIG. 9 and looking in the direction of the arrows;

FIG. 11 is a view in side elevation showing the extraction tool entered into the upper end of a fuel assembly, with certain portions of the tool and of the fuel assembly broken away and others shown in vertical section;

FIG. 12 is a view in elevation of the extraction tool taken at right angles to the view of FIG. 11;

FIG. 13 is a view in elevation of the extraction tool similar to that of FIG. 11 but with more portions thereof broken away and shown in vertical section;

FIG. 14 is a view in section substantially on line XIV—XIV of FIG. 11 and looking in the direction of the arrows;

FIG. 15 is a view in section substantially on line XV—XV of FIG. 13 and looking in the direction of the arrows;

FIG. 16 is a view in side elevation of mechanism associated with the upper portion of the tool post;

FIG. 19 is a view in elevation of the right-hand end portion of the mechanism shown in FIG. 16 with certain parts omitted;

FIG. 20 is a plan view of a tool used with the fuel handling apparatus, with a portion of the tool shown in horizontal section;

FIG. 21 is a view in vertical section of the tool, substantially on line XXI—XXI of FIG. 20, and looking in the direction of the arrows, this view also showing a centering device and a reactor access tube in vertical section;

FIG. 22 is a schematic view of a control console associated with the fuel element handling apparatus; and FIG. 23 is a diagrammatic showing of certain electrical circuits.

Figure 1:
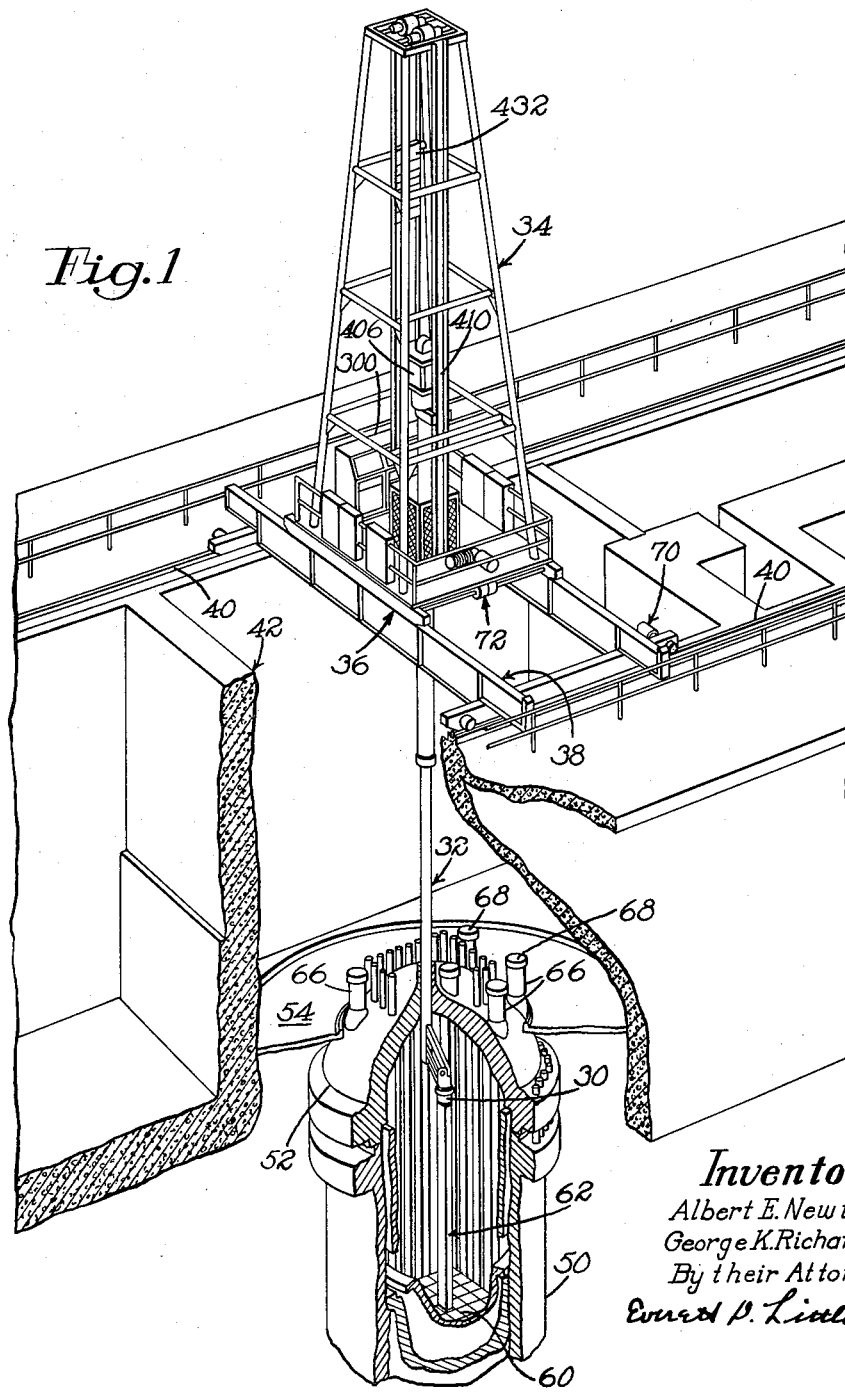
FIG. 1 is a perspective view showing a small portion of an atomic power plant, a fuel assembly extraction tool embodying the features of this invention and tool post, a crane for handling the extraction tool and a part of a water-filled canal through which the tool is lowered for access to the reactor vessel and along which the fuel assemblies are transported.

Referring to the above drawings, and particularly to FIG. 1, the fuel element assembly extraction tool of the illustrated fuel element handling apparatus, hereinafter referred to as the extraction tool, is indicated generally by the reference character 30 and is supported in a manner to be described below on the lower end of a tool post 32 which is associated with a crane construction, indicated generally by the reference character 34, and carried on a trolley 36. This trolley is supported for movement along a bridge 38 which, in turn, is mounted for movement along tracks 40, 40 extending along the opposite sides of a canal 42. The reactor vessel, indicated by the reference character 50, is located beneath the floor of the canal with its head portion 52 projecting upwardly into the canal through a shrouding piece 54. Within the reactor vessel there are two vertically spaced open grid constructions, the uppermost one of which is shown in FIGS. 1, 2, 11 and 14, and indicated by the reference character 60, for receiving and supporting the fuel element assemblies indicated by the reference character 62. As will presently appear, each fuel assembly carries a locking ring and is yieldingly urged upwardly to cause projections on this ring to engage the upper grid by means of springs, not shown. As illustrated in FIG. 14, the fuel assemblies are each of square cross section and fit in correspondingly shaped openings 64 provided by the upper and lower grid constructions. The extraction tool is adapted to be entered into the hollow upper end of a selected fuel element assembly and, by means of a single operation, to release the assembly from the grid and to couple it to the tool.

Extending upwardly from the head 52 of the reactor vessel are a plurality of access tubes or ports 66, 66, these ports being normally closed by means of welded-on covers 68, 68. The number and arrangement of these access ports with respect to the grid openings is such that all of the fuel element assemblies may be reached by the extraction tool through these ports, each access port being in direct vertical alinement with a grid opening at the center of a group of other grid openings, see left-hand showing of tool in FIG. 2, which can be reached by extending the tool radially from the tool post, see right-hand showing in FIG. 2, and by swinging the tool in azimuth by rotation of the tool post 32.

When a fuel element assembly, or a plurality of assemblies are to be removed and replaced, the reactor is shut down, the level of the water in the canal lowered to expose the access ports and to permit removal of the covers from the ports to be used, and the water level again raised. The tool post 32 will at this time be in an elevated position in which the tool 30 is in alinement with the tool post, see left-hand showing in FIG. 2, and well above the tops of the access ports. Now the tool and post are brought into substantial vertical alinement with a selected access port as the result of suitable movement of the bridge 38 along the canal by means of a bridge motor 70, and movement of the trolley 36 on the bridge and transversely of the canal, by means of a trolley motor 72. Preferably, and as shown, the sides of the grid openings extend substantially north and south and east and west and are parallel, respectively, to the directions of movements of the bridge and trolley. This alinement of the tool and post with a selected access port, before the post is lowered, by means of a hoist motor 74, is effected by moving the bridge along the canal and the trolley along the bridge to predetermined positions which may be indicated to the operator in any suitable manner.

As described below, a more accurate centering of the tool as the tool post is moved downwardly into the selected access port by means of the hoist motor is obtained by means of a centering ring indicated generally by the reference character 80, FIGS. 2 and 21, which ring is provided with electromagnetic pick-up means arranged, together with other electronic apparatus, to provide a visual indication to the operator of the exact position of the tool post within the access port in a manner to be described below, thus permitting the operator to relocate the tool post in centered position by suitable corrective movements of the bridge and/or trolley. After the tool post 32 has been lowered through the access port far enough for the tool 30 to clear the inside of the head 52 of the reactor vessel 50, the tool will be extended radially a predetermined distance from the center of the post and the post will be rotated in azimuth to a predetermined angular position in order to bring the tool directly over the particular grid opening in which the selected fuel element assembly is located. Next, the tool post is lowered to cause the tool to enter the hollow upper end portion of the fuel element assembly, see right-hand showing in FIG. 2, and see also FIGS. 11 and 13.

Referring to FIGS. 4, 7, 8, 11 and 13, the extraction tool 30 comprises a hollow body portion 90 which is supported on a housing 92 in a manner to be described below, and this housing, in turn, is mounted on the lower end of the tool post 32 by means of two parallel links 94, 96, see FIG. 3, the link 96 being in the form of a hollow tube, see FIGS. 7 and 8. Secured to the upper end of the body portion 90 of the extraction tool, by means of screws 98, 98, see FIG. 10, is the lower element 100 of a load ring assembly which has an upper element 102, FIG. 8, these two elements being of the cut-away shape shown in FIG. 8 and physically separated from each other except for four load supporting and measuring beams 104, 106, 108 and 110 which extend between the two elements, FIG. 9. The upper element 102 has secured to it by means of screws 103, 103 a flange 105, FIG. 6, which is provided with an integrally formed hollow spindle 112, this spindle being rotatably mounted within the housing 92 on ball bearings 114, 116, FIGS. 7 and 8. The link 96 is secured at its outer end by screws 120, 120, FIG. 7, to a trunnion block 122 which is pivotally mounted, by means of ball bearings 124, 124, on two upwardly extending side portions 126, 126 of the housing 92, FIG. 8. A similar arrangement, including a trunnion block 128, is provided for pivotally mounting the inner end of the link 96 to the lower end of the tool post, FIG. 3. Mounted for vertical movement in the lower end of the tool post is a slide 130 which is connected to the outer end of the link 96 by means of a link 132. This slide is adapted to be moved vertically, to extend the housing 92 and extraction tool 30 from a position of alinement of the access of the tool post 32, see left-hand showing in FIG. 2, to an extended portion radially offset therefrom, see right-hand showing in FIG. 2, by means of an operating rod 134. As is shown in FIG. 5, the trunnion block 128 is supported on the tool post 32 by means of ball bearings 135, 135 and studs 136, 136.

Referring to FIGS. 11 and 13, there is rotatably mounted in the body portion 90 of the extraction tool 30, by means of a ball bearing 140, a coupling shaft 142 provided with an upwardly directed axially extending flange 144 and having keyed to its lower end a head 146. Cut into this head are four axially extending grooves 148, 148 which, when the coupling shaft 142 and body portion of the extraction tool are in the relative angular positions shown, are in alinement, respectively, with the upwardly extending portions 150 of inverted L-shaped slots 152 having circumferentially extending portions 154 provided in the body portion 90. Slidably received on the upper half of the body portion 90, which is of cylindrical cross section, is a sleeve 160 having a radially extending flange 162 at its upper end beneath which the sleeve is of generally square cross section with rounded corners, see FIG. 15, to be received within the square-shaped openings 64 of the grid construction 60, FIGS. 11 and 13. Extending downwardly from this sleeve and located at the opposite corners of its square periphery are two pins 164, 164. Carried by the sleeve 160 is a locking pin 170 which extends through two diametrically opposite vertical slots 172, 172, formed in the body portion 90 of the tool, and through two generally rectangular shaped openings 174, 174, formed in the flange 144 of the coupling shaft. As shown in FIG. 12, the lower sides of these two openings are provided, adjacent to their opposite ends, with notches 176, 176. Coil springs 178, 178 interposed between the sleeve 160 and the lower load ring element 100, FIGS. 6 and 8, tend to urge the pin 170 to the lower end of the slots 172, 172 and into one set of the notches 176, 176 in the openings 174, 174, thereby locking the coupling shaft 142 to the body portion 90 of the extraction tool. As will be apparent, when the sleeve 160 is elevated against the resistance of the springs 178, 178, the coupling shaft may be rotated in a counterclockwise direction as viewed in FIG. 15 until the pin 170 engages the other ends of the openings 174, 174. Now, upon release of the sleeve 160, the pin 170 will be moved into the other two notches 176, 176, thereby locking the coupling shaft and body portion together in a different angular relationship.

On the outer end of the flange 144 of the coupling shaft there are two diametrically opposed notches 180, 180 lying along an axis substantially at right angles to the pin 170 when the coupling shaft is in the position shown in FIGS. 11, 12, 13 and 15, and resting in this notch are the ends of a cross shaft 182 which carries, at right angles to its own axes, another and somewhat shorter cross shaft 184. The ends of this second cross shaft, in turn, are received in notches 186, 186 formed in two spaced-apart and downwardly extending arms 188, 188 formed integrally with the lower end of a hollow shaft 190. The shaft 190 is journaled in the flange 105 of the upper load ring element 102, by means of bearing 192 and on the housing 92 by means of a bearing 194, FIG. 8. Secured to the upper end of the shaft 190 is a bevel pinion 196 in mesh with a bevel gear 198 which is journaled on the trunnion block 122 by means of a bearing 200. The gear 198, in turn, meshes with a bevel pinion 202, carried on the outer end of a hollow shaft 204 which is journaled within the hollow link 96, by means of bearings 203 and 205, FIGS. 5 and 7. At its inner end the shaft 204 carries a pinion 206, FIG. 5, which meshes with a bevel gear 208, journaled on one of the studs 136 by means of a bearing 210, and this gear meshes with a bevel pinion 212 secured to the lower end of a hollow coupling shaft 214 which extends upwardly beyond the upper end of the tool post.

This coupling shaft is adapted to be rotated through an angle of approximately 26°, by means of mechanism to be described below, in order to effect the coupling operation. At other times, this shaft is held stationary, so that through the epicyclic gear action provided by gears 196, 198, 202, 206, 208 and 212, the extraction tool 30 will be maintained in the same orientation with the square sides of its sleeve 160 parallel to the sides of the square recesses 64 of the upper grid construction 60 as the tool post 32 is rotated to cause the tool 30 to be revolved about the axis of the tool post.

Referring to FIGS. 11 and 13, there is rotatably mounted in the upper end of each fuel element assembly, between a crosspiece 220 and a sleeve 222, secured to the body portion of the assembly, a locking ring 224. This ring has on its outer periphery four non-radial projections 226, 226, and on its inner periphery four non-radial projections 228 disposed as shown in FIG. 14. When a fuel element assembly is in place in the reactor vessel, it is urged yieldingly upwards by spring means, not shown, but associated with the lower grid construction, so that the four projections 226, which extend outwardly through slots 229 in the fuel element body, are received within notches 230, 230 formed in the lower side of the upper grid construction 60, FIGS. 11 and 13, while the projections 228, one of which is slightly longer than the others, are in vertical alinement with the grooves 148, 148 in the head 146 of the coupling shaft 142 and with the vertically extending portions 150 of the slots 152 in the body portion 90 of the extraction tool, see FIG. 14. Thus, when the extraction tool is lowered into a grid opening 64 and into the hollow upper end portion of the fuel element assembly therein, the parts will assume, in sequence, the positions shown in FIGS. 11 and 13 with the flange 162 of the sleeve 160 finally bearing aganist the upper side of the grid construction and with the upper sides of the projections 228 resting against the upper sides of the horizontally extending portions 154 of the slots 152 in the body portion of the tool.

Now, as the tool is moved further downwardly, the fuel element will be pushed downwardly by it to free the projections 226, 226 from the recesses 230, 230, thus releasing the ring 224 for rotation by the coupling shaft 142. Also, as the tool is moved downwardly, the sleeve 160 will be lifted on the body portion 90 of the tool, as springs 178, 178, FIGS. 6 and 8, are compressed, carrying with it the locking pin 170, and releasing the coupling shaft 142. This shaft may now be rotated in a counterclockwise direction, FIG. 15, to the extent permitted by the openings 174, 174, thereby to bring the locking pin 170 directly over the other recesses 176, 176 in these openings. As a result of this rotation of the coupling shaft, the four projections 226 are swung into the four corners of the square opening 64 of the grid construction and withdrawn into the body of the fuel element while the projections 228 are swung into the horizontally extending portions 154 of the slots 152 in the body portion of the extraction tool. During such rotation of the coupling shaft, rotation of the body portion 90 of the tool is prevented by the locating pins 164, 164 which are received within the corners of the square hollow recess at the top of the fuel element assembly, which is held against rotation by the grid 60, and the engagement of the locking pin 170 with the slots 172, 172 in the body portion of the tool. The fuel element assembly is now released from the grid 60 and coupled to the extraction tool, and as the tool is elevated to withdraw the assembly out of the grid the springs 178, 178 will expand, thereby moving the locking pin downwardly into the other notches 176, 176 on the lower sides of the openings 174, 174 to lock the coupling shaft against rotation relatively to the body portion of the tool. The spent fuel assembly may now be withdrawn from the reactor vessel, transported through the canal to a storage area adjacent thereto, and deposited in a receiving and storage device, not shown, but which is provided with upper and lower grid constructions similar to those provided in the reactor vessel, whereupon the above-described procedure is reversed to uncouple the assembly from the tool and to lock it in place in the storage device.

By centering the tool post within the access port as the tool is lowered toward the selected fuel assembly, and by extending the tool axially from the tool head and swinging the post and tool in azimuth in accordance with predetermined coordinates related to the axis of the particular access port being used, the tool may be alined vertically with the selected fuel assembly before the final lowering of the post to cause the lower end of the body portion of the tool to enter the hollow upper end of the fuel assembly. If there has been any inaccuracy in this pre-positioning of the tool with respect to the fuel assembly, the tool will strike the upper end of the assembly, or perhaps even the upper side of the grid, on one or two of its four sides, depending on the exact direction of the misalinement. The fact of each misalinement and a visual indication of the magnitude and direction of the force thus imposed on the tool is provided for the information of the operator of the tool to assist him in making the necessary corrective movements of the tool to obtain the exact alinement required.

As described above, the lower and upper load ring elements 100, 102 are physically connected by means of four load supporting and measuring beams 104, 106, 108 and 110. Mounted on the upper and lower sides of the inner ends of each of these beams are a pair of strain gages 250 of a type available in the open market and having leads 252, 254 which are connected to a conventional bridge circuit, diagrammatically illustrated in FIG. 23, in such a way that the output voltage of each bridge circuit varies as to magnitude and sign in accordance with the bending strain imposed on the particular beam. Thus, when the tool is suspended freely from the housing 92, the weight of the tool, which is directly axial of the load ring assembly, comprising the lower element 100, beams 104, 106, 108 and 110, and the upper element 102, connected to the housing, will be equally supported by each of the four beams, and the summation of the output voltages of the four bridge circuits will be a measure of the dead weight of the tool. The same will also be true when a fuel element assembly coupled to the tool has been withdrawn from the grid construction and is suspended freely from the tool. For the above purpose, the outputs of the four bridge circuits are led into a summing circuit, as diagrammatically illustrated in FIG. 23, and the output thereof is led to a voltmeter calibrated in plus or minus pounds of total load, i.e., tension or compression. The output voltage of each bridge circuit is also connected through suitable circuitry to one of the four deflecting plates of a cathode ray tube so that the spot of light on the face of the tube will assume a position which is offset from center in a direction and extent determined by the direction of offset and the intensity of the bending load imposed on the tool. The various circuits referred to above, as well as others still to be mentioned, are contained within a control console 300, FIG. 22, which for the convenience of the operator is mounted on the trolley 36, FIG. 1. The voltmeter, which is calibrated to measure plus or minus total load on the tool 30, is indicated by the reference character 302, while the cathode tube used to indicate the direction and intensity of the bending load imposed on the tool, which will result from the application of a non-axial force, is indicated by the reference character 304.

As is shown in FIGS. 6 and 9, the load beams 104, 106, 108 and 110, as well as the strain gages 250, 250 mounted thereon, are encapsulated by means of Sylphon bellows 320, while the leads 252, 254 from the strain gages are brought out through conduit tubes 322, 324 to a closed manifold 326 which is secured to the lower load ring element 100 by means of brackets 328, FIGS. 9 and 10. From the manifold 326 a tube 330 extends upwardly through a bore in the coupling shaft 190 and is connected, at its upper end, by means of a Sylphon bellows 332, FIG. 8, to the lower end of another similar tube, not shown, which extends through a bore in the shaft 204, this tube, in turn, being connected by a Sylphon bellows 334, FIG. 5, to still another tube, not shown, which extends upwardly through a bore in the coupling operating shaft 214. The upper end of the last-mentioned tube is connected to a source of inert gas under a slight pressure so that leakage of water into the space within the encapsulated bellows 320 is avoided.

As was suggested above, movement of the sleeve 160 axially on the body portion 90 of the extraction tool, to unlock the coupling shaft 142, is effected by the engagement of the flange 162 on this sleeve with the upper side of the fuel element supporting grid 60. It may, however, become desirable to rotate the coupling shaft relatively to the body portion of the tool, thereby to disconnect the fuel element from the tool under conditions where movement of this sleeve in the aforementioned manner is impossible. To permit such uncoupling of the tool from a fuel element, the following arrangement is provided. Secured to and extending upwardly from the flange 162 on the sleeve 160 are four straps 350, 350, which are connected at their upper ends to a lift ring 352, FIGS. 4, 7 and 8. Slidably mounted within guides 360, 360, secured to the opposite sides of the housing 92, FIG. 8, are two lifting hooks 362, 362 having stems 364, 364. Secured to the upper end of each of these stems is a flexible cable 366 and these cables are trained over suitable guide sheaves 370, FIG. 8, 372, 374, 376 and 378, FIG. 3, to a header piece 380 from which a single operating cable 382 extends to the upper end of the tool post. A manually operable screw 384, FIG. 18, associated with the upper end of the tool post 32 is provided for exerting an upward pull on the cable 382 to elevate the lifting ring 352 and sleeve 160, thereby to unlock the coupling shaft. Surrounding each of the stems 364 is a relatively light return spring 384 which extends between a portion of the guide 360 and a collar 386 on the stem.

Figure 17:
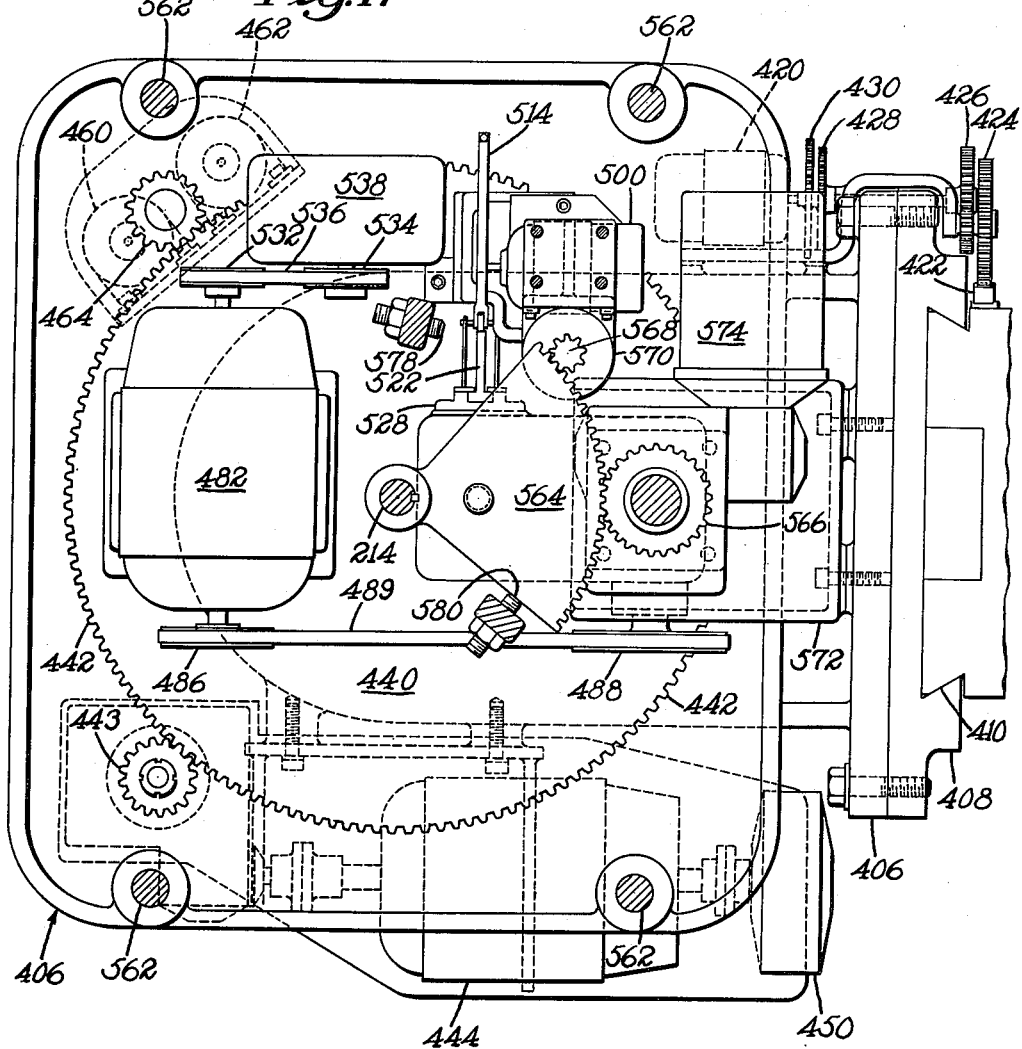
FIG. 17 is a plan view of the mechanism shown in FIG. 16.
Figure 18:
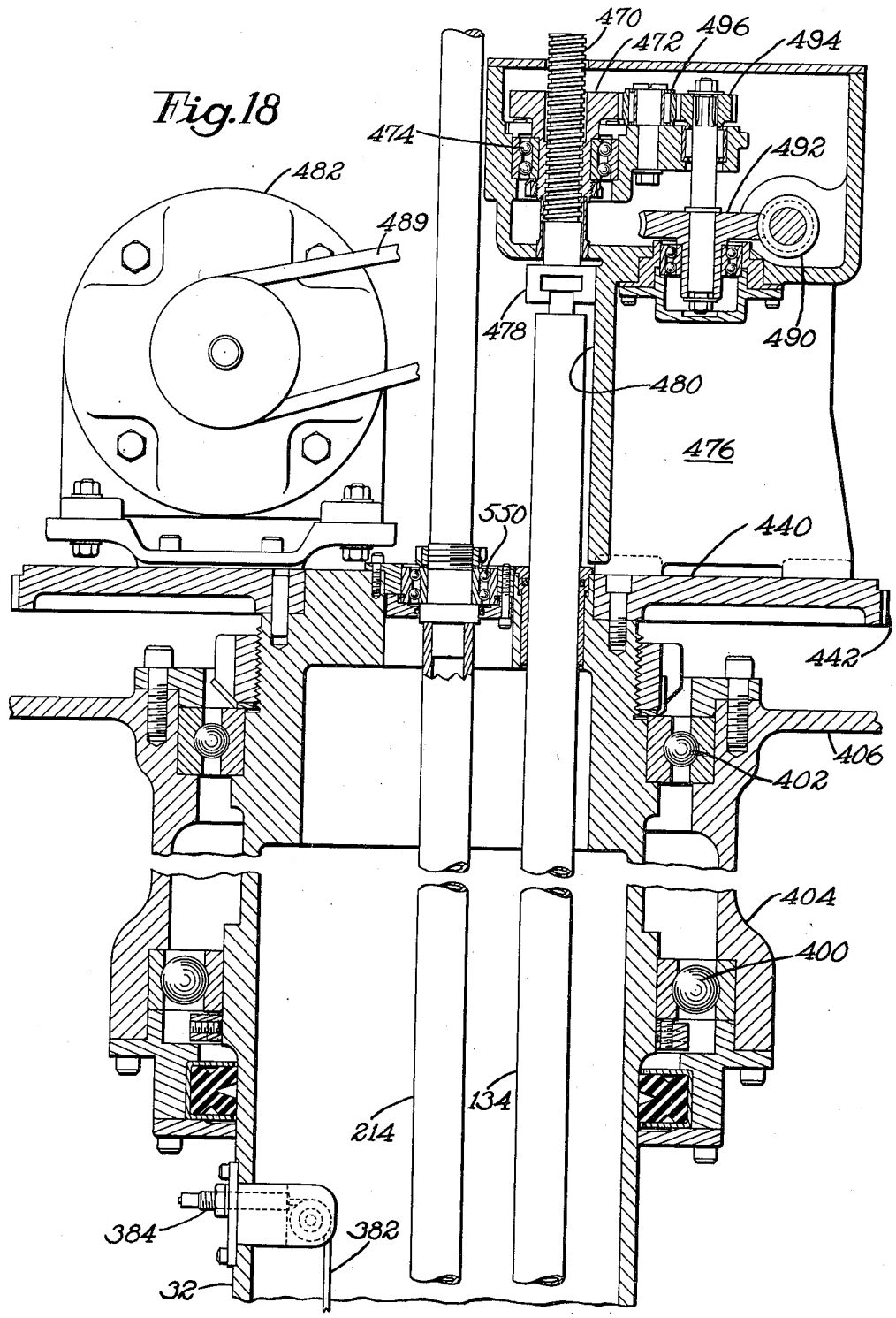
FIG. 18 is a view in side elevation of a portion of the mechanism illustrated in FIG. 16 shown at an enlarged scale and with certain parts thereof in vertical section.

At its upper end, the tool post 32 is rotatably mounted, by means of spaced bearings 400, 402, FIG. 18, in a downwardly extending portion 404 of a housing indicated generally by the reference character 406, see also FIGS. 16 and 17. Secured to the housing is a dovetail guide plate 408 which engages an elongated slide 410, FIG. 17, for guiding the housing for vertical movement on the crane construction 34 by means of the hoist motor 74, FIG. 1, which motor is connected to the housing by means of suitable cables and drive mechanism, not shown. For indicating to the operator the heightwise location of the housing 406 and hence of the tool post 32 and the tool 30, coarse and fine Selsyn generators, one of which is indicated by the reference character 420 in FIG. 17, are provided, these motors being driven from a rack 422, secured to the slide 410, and gears 424, 426, 428, 430. These Selsyn generators are connected through suitable electrical leads, not shown, to coarse and fine repeater motors which are mounted within the console 300, FIG. 22, and provided with indicating dials marked $H_C$ and $H_F$. The hoist motor 74 is adapted to be placed under the influence of a controlling circuit, located within the console, for determining its speed and direction of rotation. Also connected to the housing 406 by suitable cables, not shown, is a counterweight 432, FIG. 1, for balancing the weight of the tool post 32 and tool 30.

Secured to the upper end of the post 32 is a large circular plate 440 having gear teeth 442 cut on its periphery, FIGS. 17 and 18. Meshing with these teeth is a pinion 443 which is arranged to be driven by an azimuth motor 444 through a gear reduction device 446 and an overload clutch 448, FIG. 16. Also connected to this motor is an electrical brake device 450. The motor 444, similarly to the hoist motor 74, can be placed under the influence of the control circuit in the console 300 for determining its speed and direction of rotation. For indicating the angular position of the tool post 32 and hence of the extraction tool 30, carried thereby, coarse and fine Selsyn generators 460, 462, FIG. 17, are provided, these motors being driven by suitable gearing, including a pinion 464 in mesh with the teeth 442 on the periphery of the plate 440. These Selsyn generators are connected through suitable electrical leads to coarse and fine repeater motors located in the console 300, FIG. 22, and provided with indicating dials marked $A_C$ and $A_F$, respectively.

The operating rod 134 is connected, at its upper end, to a screw 470 which is threaded through a gear 472, FIG. 18. This gear is rotatably mounted, by means of a bearing 474, in an auxiliary housing 476 supported on the plate 440. A square head 478 has one side in engagement with a flat surface 480, formed on the housing 476 to prevent rotation of the screw 470. Therefore, when the gear 472 is rotated, the screw 470 and operating rod 134 will be moved in the direction of their axes. For thus rotating the gear 472 a motor 482, also mounted on the plate 440, drives a worm 474 by means of pulleys 486, 488 and a belt 489, while this worm drives a worm wheel 490 operatively connected to the gear 472 by means of gears 494, 496. The motor 482, like the motor 444, referred to above, is adapted to be connected to the control circuit in the console 300 for determining its speed and direction of rotation.

For indicating the heightwise position of the rod 134 and hence the radial position of the tool 30 with respect to the tool post 32, i.e., the extension of the tool, coarse and fine Selsyn generators 500, 502 are provided, FIG. 19. These motors are operatively connected by means of gearing including gears 504, 506, 508, 510 and 512 to a rack 514 which is slidably mounted in a frame construction 516. At its right-hand end, this rack carries a cam roll 518 which is yieldingly held against the curved surface 520 of a cam 522 by means of a coil spring 524 and a cable 526. This cam is slidably mounted in a guide 528, see also FIG. 17, on the housing 476, and is connected to the head 478 on the screw 470 by means of an operating arm 530. As will be apparent, when the screw 470 and operating rod 134 are moved downwardly from the positions in which they are shown in FIG. 19, the rack 514 will be moved to the right and the generators 500, 502 will be rotated. These generators are connected through suitable electrical leads to coarse and fine Selsyn repeaters located in the console 300 and having indicating dials designated by the reference characters $E_C$ and $E_F$, FIG. 22. The motor 482 is also connected, by means of pulleys 532, 534 and a belt 536 to an electrical braking device 538, FIG. 17.

The coupling operating shaft 214 extends upwardly through, and is journaled on a bearing 550 within the plate 440, FIG. 18, and is also rotatably supported at its extreme upper end in an auxiliary platform 560, mounted on the plate 440 by means of posts 562, 562, FIG. 16. Secured to this coupling shaft adjacent to its upper end is a gear quadrant 564 which meshes with a drive pinion 566 and also with an indicating pinion 568 associated with a Selsyn generator 570, FIG. 17. Supported on a bracket 572 which is carried on a portion of the housing 406 is a coupling drive motor 574 which is operatively connected to the aforementioned drive pinion 566 by means including an overload clutch 578. Similarly to the motors 74, 444 and 482, the coupling motor 574 is adapted to be placed under the influence of the aforementioned control circuit in the console 300 for determining its speed and direction of rotation. For limiting the angular movement of the coupling shaft, two adjustable stop screws 578 and 580 are provided. The Selsyn generator 570 is connected to a Selsyn repeater associated with the console 300 and having an indicating dial identified by the reference character $C_R$, FIG. 22.

The trolley motor 72 and the bridge motor 70 are likewise adapted to be placed under the influence of the aforementioned control circuit which is located in the console 300. For bringing any one of the six motors mentioned above under the influence of this control circuit, a selector switch having a rotary handle 600 is provided on the console, FIG. 22, and located adjacent to this switch are six signal lights, $L_C$, $L_E$, $L_A$, $L_B$, $L_T$, $L_H$, adapted to indicate when a particular motor is connected to this control circuit. The control circuit provided may be of any suitable type and such as to provide, when connected to a selected motor, for a coarse and a fine speed control of the motor in either direction by means of two control handles identified by the reference characters 602 and 604. As will be apparent, with the described arrangement, only one of the six motors can be operated at any one time.

As suggested above, when the tool post 32 and extraction tool 30 are being lowered through a selected access port, and thereafter as the post is being rotated to swing the tool in azimuth, accurate centering of the tool post 32 within the access port may be facilitated by means of the centering ring 80, novel features of which are claimed in a copending application Serial No. 781,621, filed December 19, 1958, in the name of Ralph E. Karcher, Jr., now abandoned. Referring to FIG. 21, this ring is recessed at 650 to fit snugly over the top of an access tube 66, after its cap 68 has been removed, and is provided with two pins 652, 652 adapted to enter within grooves 654, 654 in the outer surface of the tube for orienting the ring. At its lower edge, the recess 650 is chamfered, as indicated at 656, to facilitate its assembly on an access tube. Secured to the upper portion of this ring, and located in quadrature thereon, i.e., 90° apart, are four induction coils 660, 660, three of which appear in FIG. 21. These four coils are connected, through a suitable electronic circuit, to the four plates of a cathode ray tube 662, FIG. 22, and the arrangement is such that when the tool post 32 is exactly centered within the opening of the access port, i.e., spaced equally from the four pick-up coils on the ring 80, the spot of light on the face of this tube will be in a centered position. Now, if the tool post should move away from the exactly centered position, the spot will do likewise on the face of the tube, thus indicating this condition to the operator, who, by manipulating the trolley and/or bridge motors, under fine speed control, can realine the tool post within the access port, Extending through the ring 80, adjacent to its upper edge, are three radially extending bores 670, by means of which it may be connected to a handling tool indicated generally by the reference character 680, FIGS. 20 and 21. This handling tool comprises a circular head 682 having a downwardly extending flange 684 which is provided with an inner cylindrical surface 686 adapted to fit snugly over a cylindrical surface 688 on the ring 80. Extending upwardly from this head is a hub portion 690 in which a spindle 692 is rotatably mounted by means of bearing bushings 694, 694. This spindle is secured to the lower end of an elongated tube 696 and has a central bore 698. Carried on the lower end of this spindle is an operating member 700 having three radial arms 702, located 120° apart, two of which appear in the drawings, and connected to these arms by means of links 704 are three plungers 706, adapted to be projected into the bores 670 in the ring 80, as shown in FIG. 21. Slidably mounted in the operating member 700 is a locking pin 708 which is adapted to be received in one or the other of two holes 710, 712, see FIG. 20, in the head 682, this pin being connected to one end of a lever 714, pivotally mounted on the member 700. A pin 716 carried by the head 682 extends into an arcuate slot 718 in the member 700 thereby to limit angular movement of the latter. Secured to the upper end of the tube 696 is a hand wheel 720 having a central hub portion 722 to which there is attached a lifting hook 724, shown partly broken away in FIG. 21. Threaded into this hub portion is a guide sleeve 726 for an operating plunger 728 which has a knob 730 thereon. Extending between this plunger and the lever 714 is a link 732.

In using the centering ring handling tool, a ring 80 is coupled thereto, as shown in FIG. 21, and then the tool and ring are lowered into the canal, by means of a suitable auxiliary crane, not shown, to place the ring on the top of an access tube 66 from which the cover 68 has previously been removed. Now, the ring is rotated by the handle 720 until the pins 652, 652 thereon line up with the grooves 654, 654 in the access tube, whereupon the ring is lowered still farther and until a shoulder 740 formed thereon engages the upper end of the access tube. Next, the operator pulls upwardly on the knob 730, thereby withdrawing the pin 708 from the hole 710 and releasing the operating member 700 for rotary movement in a counterclockwise direction, FIG. 20, by means of the hand wheel 720 to withdraw the three plungers 706 from the bores 670 in the ring 80. The handling tool 680 may now be elevated by the crane and removed from the canal, leaving the centering ring 80 in place on the access tube. To remove the ring from the access tube, the above procedure is reversed. In order to facilitate alinement of the plungers 706 with the bores 670, the head 682 carries a locating pin 742 which is received within a slot 744 cut into the upper edge of the ring 80.

Having thus described our invention, what we claim as new and desire to secure by Letters Patent of the United States is:

1. A tool for extracting a fuel element assembly, having an open upper end and provided with a locking and coupling ring having inwardly extending lugs, from the supporting grid of an atomic reactor, comprising a body portion shaped to provide a plurality of circumferentially arranged surfaces for receiving and supporting the lugs of a fuel element locking and coupling ring and a plurality of axially extending passages providing access to said surfaces, a coupling member rotatably mounted within said body portion and provided with axially extending surfaces for engaging said lugs, means for rotating the coupling member to two different angular positions, one of which disposes said lug engaging surfaces thereof in alinement with the axially extending passages of said body portion and the other of which disposes said surfaces across the circumferentially arranged lug receiving and supporting surfaces on the body portion, and means including an axially movable sleeve slidable on the body portion for locking said coupling member to said body portion in each of said two different angular positions.

2. A tool for extracting a fuel element assembly, having an open upper end and provided with a locking and coupling ring having inwardly extending lugs, from the supporting grid of an atomic reactor, comprising a body portion shaped to provide a plurality of circumferentially arranged surfaces for receiving and supporting the lugs of a fuel element locking and coupling ring and a plurality of axially extending passages providing access to said surfaces, a coupling member rotatably mounted within said body portion and provided with axially extending surfaces for engaging said lugs, means for rotating the coupling member to two different angular positions, one of which disposes said lug engaging surfaces thereof in alinement with the axially extending passages of said body portion and the other of which disposes said surfaces across the circumferentially arranged lug receiving and supporting surfaces on the body portion, means including an axially movable sleeve slidable on the body portion for locking said coupling member to said body portion in each of said two different angular positions, and yieldable means for urging said sleeve axially of the body portion to locking position.

3. A tool for extracting a fuel element assembly having an open upper end and provided with a locking and coupling ring having inwardly extending lugs, from the supporting grid of an atomic reactor comprising a substantially cylindrical body portion adapted to be received within the grid openings and the open upper ends of fuel elements therein and shaped to provide a plurality of circumferentially arranged surfaces for receiving and supporting the lugs of a fuel element locking and coupling ring and a plurality of axially extending passages providing access to said surfaces, a coupling member rotatably mounted within said body portion and provided with axially extending surfaces for engaging said lugs, means for rotating the coupling member to two different angular positions, one of which disposes said lug engaging surfaces thereof in alinement with the axially extending passages of said body portion and the other of which disposes said surfaces across the circumferentially arranged lug receiving and supporting surfaces on the body portion, and means for locking said coupling member to said body portion in each of said two different angular positions.

4. A tool for extracting a fuel element assembly having an open upper end and provided with a locking and coupling ring having inwardly extending lugs, from the supporting grid of an atomic reactor comprising a substantially cylindrical body portion adapted to be received within the grid openings and the open upper ends of fuel elements therein and shaped to provide a plurality of circumferentially arranged surfaces for receiving and supporting the lugs of a fuel element locking and coupling ring and a plurality of axially extending passages providing access to said surfaces, a coupling member rotatably mounted within said body portion and provided with axially extending surfaces for engaging said lugs, means for rotating the coupling member to two different angular positions, one of which disposes said lug engaging surfaces thereof in alinement with the axially extending passages of said body portion and the other of which disposes said surfaces across the circumferentially arranged lug receiving and supporting surfaces on the body portion, means for locking said coupling member to said body portion in each of said two different angular positions, and yieldable means for urging said locking means axially of the body portion to locking position.

5. A tool for extracting a fuel element assembly having an open upper end and provided with a locking and coupling ring having inwardly extending lugs, from the supporting grid of an atomic reactor comprising a substantially cylindrical body portion adapted to be received within the grid openings and the open upper ends of fuel elements therein and shaped to provide a plurality of circumferentially arranged surfaces for receiving and supporting the lugs of a fuel element locking and coupling ring and a plurality of axially extending passages providing access to said surfaces, a coupling member rotatably mounted within said body portion and provided with axially extending surfaces for engaging said lugs, means for rotating the coupling member to two different angular positions, one of which disposes said lug engaging surfaces thereof in alinement with the axially extending passages of said body portion and the other of which disposes said surfaces across the circumferentially arranged lug receiving and supporting surfaces on the body portion, means including an axially movable sleeve slidable on the body portion for locking said coupling member to said body portion in each of said two different angular positions, and yieldable means for urging said sleeve axially of the body portion to locking position, said sleeve being provided with a radially extending flange adapted to engage the upper surface of the fuel element supporting grid for displacing the sleeve axially against said yieldable means to unlock the coupling member.

6. A tool for extracting a fuel element assembly, having an open upper end and provided with a locking and coupling ring having tool engaging lugs, from the supporting grid of an atomic reactor comprising a body portion adapted to be entered into the open upper end of a fuel element assembly through a grid opening, a support for said body portion mounted for movement in two directions parallel to the plane of said supporting grid to aline the tool with one of the grid openings and the fuel element therein and in a direction at right angles to said plane for causing the tool to enter the open upper end of said fuel element, and a load supporting member interposed between the tool and the support and having associated therewith strain measuring devices for sensing the direction and magnitude of the load imposed on said tool.

7. A tool for extracting a fuel element assembly, having an open upper end and provided with a locking and coupling ring having tool engaging lugs, from the supporting grid of an atomic reactor comprising a body portion adapted to be entered into the open upper end of a fuel element assembly through a grid opening, a support for said body portion mounted for movement in two directions parallel to the plane of said supporting grid to aline the tool with one of the grid openings and the fuel element therein and in a direction at right angles to said plane for causing the tool to enter the open upper end of said fuel element, and a load supporting member interposed between the tool and the support and having associated therewith electrical strain measuring devices for sensing the direction and magnitude of the load imposed on said tool.

8. A tool for extracting a fuel element assembly, having an open upper end and provided with a locking and coupling ring having tool engaging lugs, from the supporting grid of an atomic reactor comprising a body portion adapted to be entered into the open upper end of a fuel element assembly through a grid opening, a support for said body portion mounted for movement in two directions parallel to the plane of said supporting grid to aline the tool with one of the grid openings and the fuel element therein and in a direction at right angles to said plane for causing the tool to enter the open upper end of said fuel element, a load supporting means interposed between the tool and the support comprising inner and outer members interconnected by four radially extending beams arranged in quadrature, and strain measuring devices associated with each of said beams for sensing the direction and magnitude of the load imposed on the tool.

9. A tool for extracting a fuel element assembly, having an open upper end and provided with a locking and coupling ring having tool engaging lugs, from the supporting grid of an atomic reactor comprising a body portion adapted to be entered into the open upper end of a fuel element assembly through a grid opening, a support for said body portion mounted for movement in two directions parallel to the plane of said supporting grid to aline the tool with one of the grid openings and the fuel element therein and in a direction at right angles to said plane for causing the tool to enter the open upper end of said fuel element, a load supporting means interposed between the tool and the support comprising inner and outer members interconnected by four radially extending beams arranged in quadrature, and electrical strain measuring devices associated with each of said beams for sensing the direction and magnitude of the load imposed on the tool.

10. A tool for extracting a fuel element assembly having an open upper end and provided with a locking and coupling ring having tool engaging lugs, from the supporting grid of an atomic reactor comprising a body portion adapted to be entered into the open upper end of a fuel element assembly through a grid opening, a support for said body portion mounted for movement in two directions parallel to the plane of said supporting grid to aline the tool with one of the grid openings and the fuel element therein and in a direction at right angles to said plane for causing the tool to enter the open upper end of said fuel element, a load supporting means interposed between the tool and the support comprising inner and outer ring-like members interconnected by four radially extending beams arranged in quadrature, and strain measuring devices associated with each of said beams for sensing the direction and magnitude of the load imposed on the tool.

11. A tool for extracting a fuel element assembly, having an open upper end and provided with a locking and coupling ring having tool engaging lugs, from the supporting grid of an atomic reactor comprising a body portion adapted to be entered into the open upper end of a fuel element assembly through a grid opening, a support for said body portion mounted for movement in two directions parallel to the plane of said supporting grid to aline the tool with one of the grid openings and the fuel element therein and in a direction at right angles to said plane for causing the tool to enter the open upper end of said fuel element, a load supporting means interposed between the tool and the support comprising inner and outer ring-like members interconnected by four radially extending beams arranged in quadrature, and electrical strain measuring devices associated with each of said beams for sensing the direction and magnitude of the load imposed on the tool.

12. A tool for extracting a fuel element assembly, having an open upper end and provided with a locking and coupling ring having tool engaging lugs, from the supporting grid of an atomic reactor comprising a body portion adapted to be entered into the open upper end of a fuel element assembly through a grid opening, a support for said body portion mounted for movement in two directions parallel to the plane of said supporting grid to aline the tool with one of the grid openings and the fuel element therein and in a direction at right angles to said plane for causing the tool to enter the open upper end of said fuel element, a load supporting means interposed between the tool and the support comprising inner and outer ring-like members interconnected by four radially extending beams arranged in quadrature, and strain measuring devices mounted on the upper and lower surfaces of each of said beams adjacent to its point of connection with said inner member for sensing the direction and magnitude of the load imposed on the tool.

13. A tool for extracting a fuel element assembly, having an open upper end and provided with a locking and coupling ring having tool engaging lugs, from the supporting grid of an atomic reactor comprising a body portion adapted to be entered into the open upper end of a fuel element assembly through a grid opening, a support for said body portion mounted for movement in two directions parallel to the plane of said supporting grid to aline the tool with one of the grid openings and the fuel element therein and in a direction at right angles to said plane for causing the tool to enter the open upper end of said fuel element, a load supporting means interposed between the tool and the support comprising inner and outer ring-like members interconnected by four radially extending beams arranged in quadrature, and electrical strain measuring devices mounted on the upper and lower surfaces of each of said beams adjacent to its point of connection with said inner member for sensing the direction and magnitude of the load imposed on the tool.

14. A tool for extracting a fuel element assembly, having an open upper end and provided with a locking and coupling ring having tool engaging lugs, from the supporting grid of an atomic reactor comprising a body portion adapted to be entered into the open upper end of a fuel element assembly through a grid opening and shaped to provide a plurality of circumferentially arranged surfaces for receiving and supporting the lugs of a fuel element locking and coupling ring and a plurality of axially extending passages providing access to said surfaces, a coupling member rotatably mounted within said body portion and provided with axially extending surfaces for engaging said lugs, means for rotating the coupling member to two different angular positions, one of which disposes said lug engaging surfaces thereof in alinement with the axially extending passages of said body portion and the other of which disposes said surfaces across the circumferentially arranged lug receiving and supporting surfaces on the body portion, means for locking said coupling member to said body portion in each of said two different angular positions, a support for said body portion, and a load supporting member interposed between the tool and the support and having associated therewith strain measuring devices for sensing the direction and magnitude of the load imposed on said tool.

15. A tool for extracting a fuel element assembly, having an open upper end and provided with a locking and coupling ring having tool engaging lugs, from the supporting grid of an atomic reactor comprising a body portion adapted to be entered into the open upper end of a fuel element assembly through a grid opening and shaped to provide a plurality of circumferentially arranged surfaces for receiving and supporting the lugs of a fuel element locking and coupling ring and a plurality of axially extending passages providing access to said surfaces, a coupling member rotatably mounted within said body portion and provided with axially extending surfaces for engaging said lugs, means for rotating the coupling member to two different angular positions, one of which disposes said lug engaging surfaces thereof in alinement with the axially extending passages of said body portion and the other of which disposes said surfaces across the circumferentially arranged lug receiving and supporting surfaces on the body portion, means for locking said coupling member to said body portion in each of said two different angular positions, a support for said body portion, and a load supporting member interposed between the tool and the support comprising inner and outer ring-like members interconnected by four radially extending beams arranged in quadrature, and electrical strain measuring devices mounted on the upper and lower surfaces of each of said beams adjacent to its point of connection with said inner member for sensing the direction and magnitude of the load imposed on the tool.

References Cited in the file of this patent
UNITED STATES PATENTS

| | | |
|---|---|---|
| 1,689,702 | Vickers | Oct. 30, 1928 |
| 1,996,068 | Hinderliter | Apr. 2, 1935 |
| 2,075,954 | Osgood | Apr. 6, 1937 |
| 2,861,699 | Youmans | Nov. 25, 1958 |
| 2,861,700 | James | Nov. 25, 1958 |

OTHER REFERENCES

McLain et al.: "Problems in Nuclear Engineering," vol. 1, pp. 267–277, edited by Hughes et al., Pergomon Press, 1957. The preprint of this article was available to the public on December 3, 1955.